(12) United States Patent
Guim Bernat

(10) Patent No.: US 12,393,456 B2
(45) Date of Patent: Aug. 19, 2025

(54) RESOURCE SELECTION BASED IN PART ON WORKLOAD

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/324,525

(22) Filed: May 19, 2021

(65) Prior Publication Data
US 2021/0271517 A1     Sep. 2, 2021

(51) Int. Cl.
| G06F 9/50 | (2006.01) |
| G06N 3/02 | (2006.01) |
| G06N 3/08 | (2023.01) |

(52) U.S. Cl.
CPC ........... G06F 9/5005 (2013.01); G06F 9/505 (2013.01); G06N 3/02 (2013.01); G06N 3/08 (2013.01)

(58) Field of Classification Search
CPC ......... G06F 9/505; G06F 9/5005; G06N 3/08; G06N 3/02
See application file for complete search history.

(56) References Cited

U.S. PATENT DOCUMENTS

| 9,912,774 B2 * | 3/2018 | Daly ................ H04L 69/22 |
| 2016/0379111 A1 * | 12/2016 | Bittner, Jr. ........... G06F 9/3885 |
| | | 706/25 |
| 2018/0173291 A1 * | 6/2018 | Levit-Gurevich .... G06F 1/3206 |
| 2019/0042234 A1 * | 2/2019 | Bernat .................. G06F 12/06 |
| 2019/0042870 A1 * | 2/2019 | Chen .................. G06F 18/2163 |
| 2019/0188570 A1 * | 6/2019 | Aldea Lopez ......... G06N 3/084 |
| 2020/0174840 A1 * | 6/2020 | Zhao .................... G06F 9/5011 |

OTHER PUBLICATIONS

Ullah, Qazi Zia, et al., "Adaptive Resource Utilization Prediction System for Infrastructure as a Service Cloud", Hindawi, Computational Intelligence and Neuroscience, vol. 2017, Article ID 4873459, Jul. 25, 2017, 12 pages.

* cited by examiner

*Primary Examiner* — Jacob D Dascomb
(74) *Attorney, Agent, or Firm* — Compass IP Law PC

(57) ABSTRACT

Examples described herein relate to a system comprising at least one processor and circuitry to: determine multiple configurations of hardware resources to perform a workload associated with a workload request in a subsequent stage based on a pre-processing operation associated with the workload request and at least one service level agreement (SLA) parameter associated with the workload request. In some examples, an executable binary is associated with the workload request and execution of the executable binary performs the pre-processing operation. In some examples, the circuitry is to store the multiple configurations of hardware resources to perform a workload associated with the workload request in a subsequent stage, wherein the multiple configurations of hardware resources are available for access by one or more accelerator devices to perform the workload.

21 Claims, 17 Drawing Sheets

US 12,393,456 B2

RESOURCE SELECTION BASED IN PART ON WORKLOAD

BACKGROUND

Cloud computing offers flexibility to select hardware, firmware, and/or software resources. Cloud service providers (CSPs) can offer a platform of resources for use by applications, services, containers, and so forth. Service level agreements (SLAs) can specify resource and performance requirements to perform a workload. CSPs utilize resource management technologies to achieve SLA requirements while balancing resource availability for other uses or workloads.

DETAILED DESCRIPTION

Figure 1:
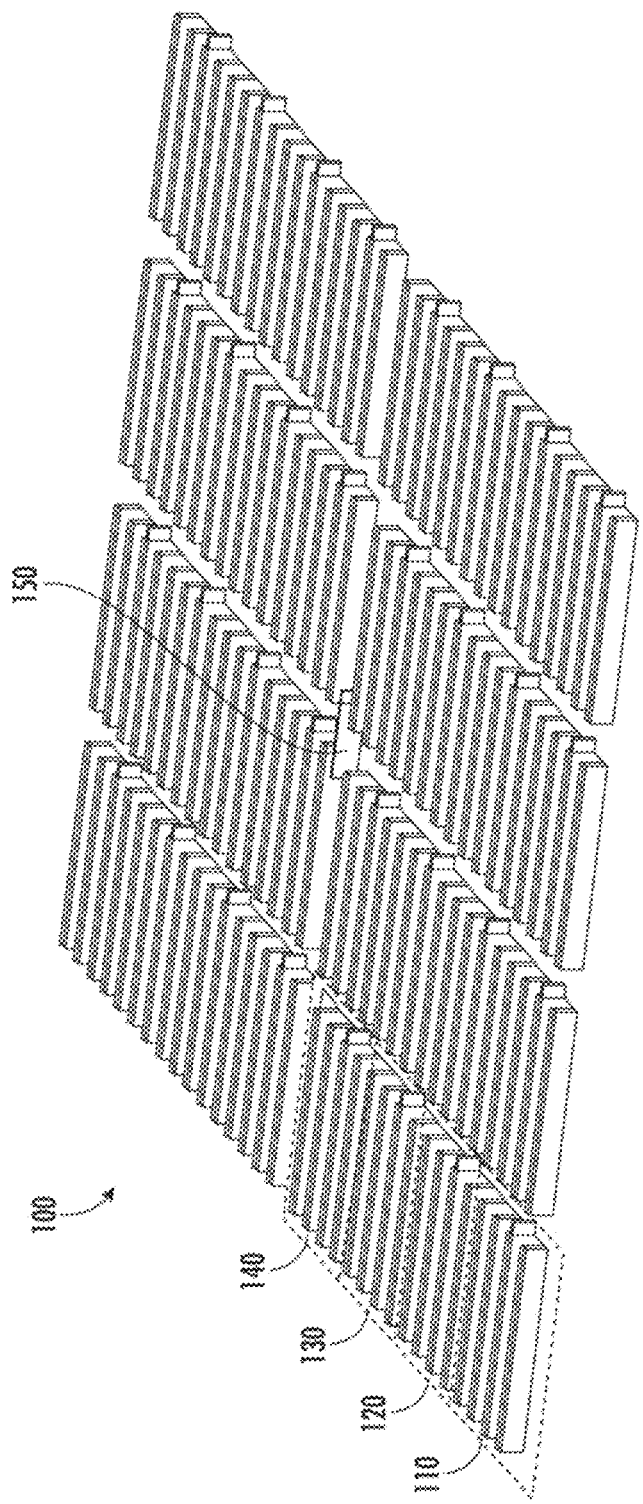
FIG. 1 is a simplified diagram of at least one data center for executing workloads with disaggregated resources.

FIG. 1 depicts a data center in which disaggregated resources may cooperatively execute one or more workloads (e.g., applications on behalf of customers) that includes multiple systems 110, 70, 130, 80, a system being or including one or more rows of racks, racks, or trays. Of course, although data center 100 is shown with multiple systems, the data center 100 may be embodied as a single system. As described in more detail herein, rack houses multiple nodes, some of which may be equipped with one or more type of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node or composite node, which can act as, for example, a server to perform a job, workload or microservices. One or more examples described herein can be used in a data center or micro data center.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

The nodes in system 110, 70, 130, 80 are connected to multiple system switches (e.g., switches that route data communications to and from nodes within the system). Switches can be positioned top of rack (TOR), end of row (EOR), middle of rack (MOR), or a position in a rack or row. The system switches, in turn, connect with spine switches 90 that switch communications among systems (e.g., the systems 110, 70, 130, 80) in the data center 100. Nodes may be connected with a fabric using standards described herein or proprietary standards. Nodes may be connected with other fabrics, such as InfiniBand or Ethernet. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 70, 130, 80. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
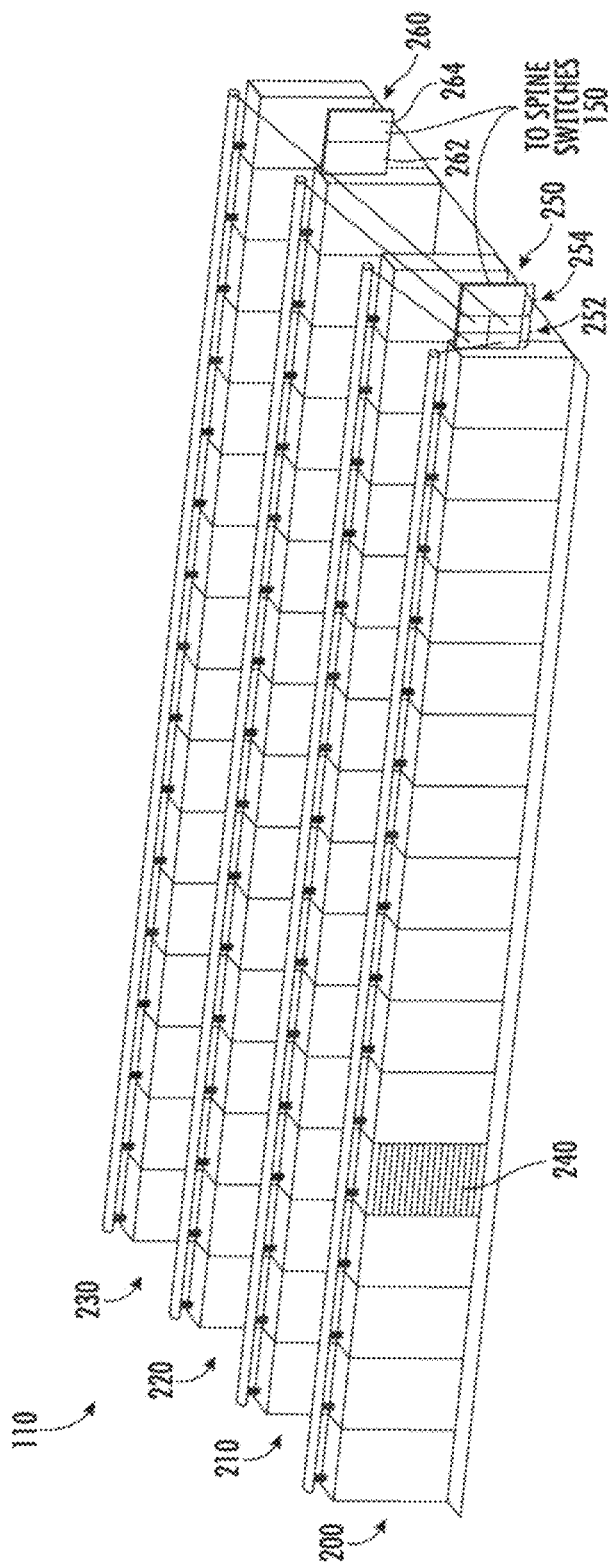
FIG. 2 is a simplified diagram of at least one system that may be included in a data center.

FIG. 2 depicts a system. A system can include a set of rows 200, 210, 220, 230 of racks 240. Rack 240 may house multiple nodes (e.g., sixteen nodes) and provide power and data connections to the housed nodes, as described in more detail herein. Racks in row 200, 210, 220, 230 are connected to multiple system switches 250, 260. The system switch 250 includes a set of ports 252 to which the nodes of the racks of the system 110 are connected and another set of ports 254 that connect the system 110 to the spine switches 90 to provide connectivity to other systems in the data center 100. Similarly, the system switch 260 includes a set of ports 262 to which the nodes of the racks of the system 110 are connected and a set of ports 264 that connect the system 110 to the spine switches 90. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, switches 90, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that systems 70, 130, 80 (as well as additional systems of the data center 100) may be similarly structured as, and have components similar to, the system 110 shown in and described in regard to FIG. 2 (e.g., system may have rows of racks housing multiple nodes as described above). Additionally, while two system switches 250, 260 are shown, it should be understood, system 110, 70, 130, 80 may be connected to a different number of system switches, providing even more failover capacity. Of course, systems may be arranged differently than the rows-of-racks configuration shown in FIGS. 1-2. For example, a system may be embodied as multiple sets of racks in which set of racks is arranged radially, e.g., the racks are equidistant from a center switch.

Figure 3:
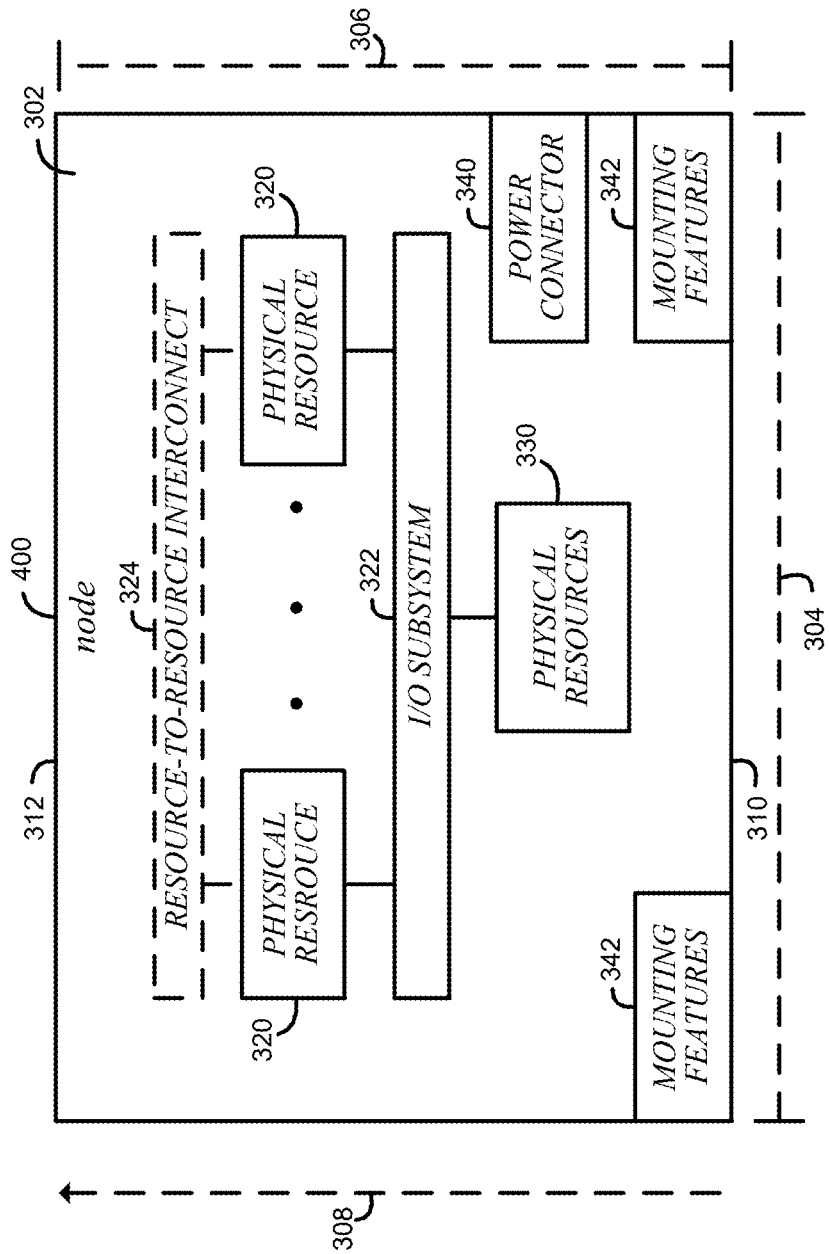
FIG. 3 is a simplified block diagram of at least one top side of a node.

Referring now to FIG. 3, node 400 may be configured to be mounted in a corresponding rack 240 of the data center 100 as discussed above. A node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8.

Although two physical resources 320 are shown in FIG. 3, it should be appreciated that the node 400 may include one, two, or more physical resources 320. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in which the node 400 is embodied as a compute node, as accelerator co-processors or circuits in which the node 400 is embodied as an accelerator node, storage controllers in which the node 400 is embodied as a storage node, or a set of memory devices in which the node 400 is embodied as a memory node.

The node 400 also includes one or more additional physical resources 330 mounted to circuit board substrate 302. The additional physical resources include a network interface controller (NIC) as discussed in more detail below. Of course, depending on the type and functionality of the node 400, the physical resources 330 may include additional or other electrical components, circuits, and/or devices.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. The I/O subsystem 322 is embodied as, or otherwise includes, a double data rate 4 (DDR4) data bus or a DDR5 data bus.

The node 400 may also include a resource-to-resource interconnect 324. The resource-to-resource interconnect 324 may be embodied as any type of communication interconnect capable of facilitating resource-to-resource communications. The resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect dedicated to resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. Voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

The node 400 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 400 without damaging the circuit board substrate 302 or the electrical components mounted thereto.

Figure 4:
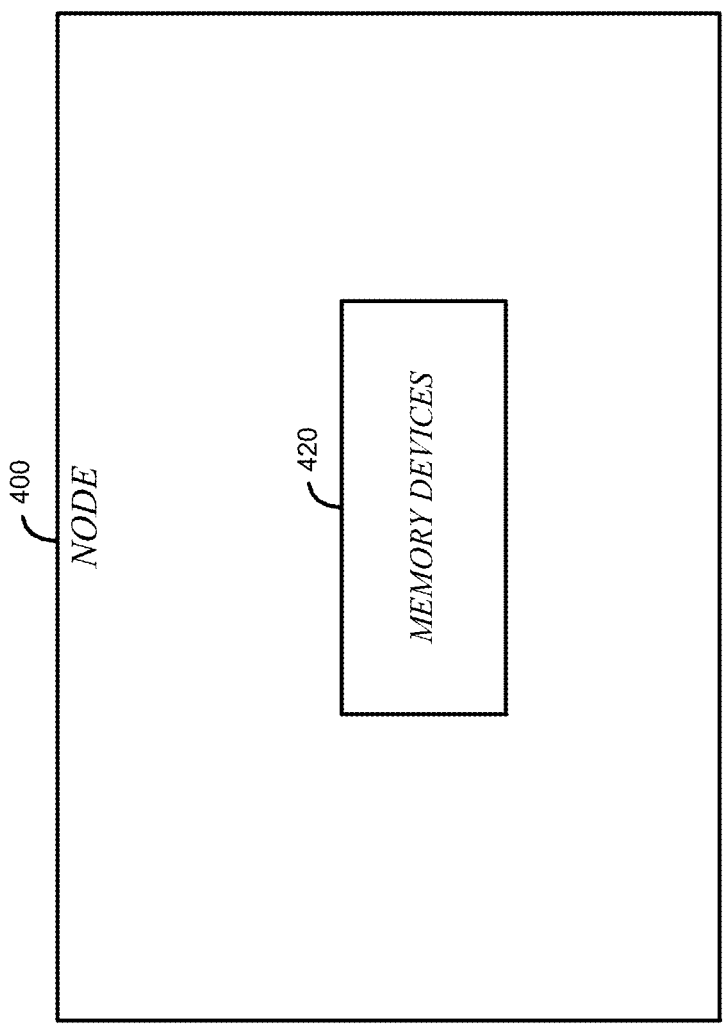
FIG. 4 is a simplified block diagram of at least one bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420. Alternatively, physical resource 320 may be communicatively coupled to memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

Memory device can be block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. The memory device may comprise a transistor-less stackable cross point architecture in which memory cells sit at the intersection of word lines and bit lines and are individually addressable and in which bit storage is based on a change in bulk resistance.

Figure 5:
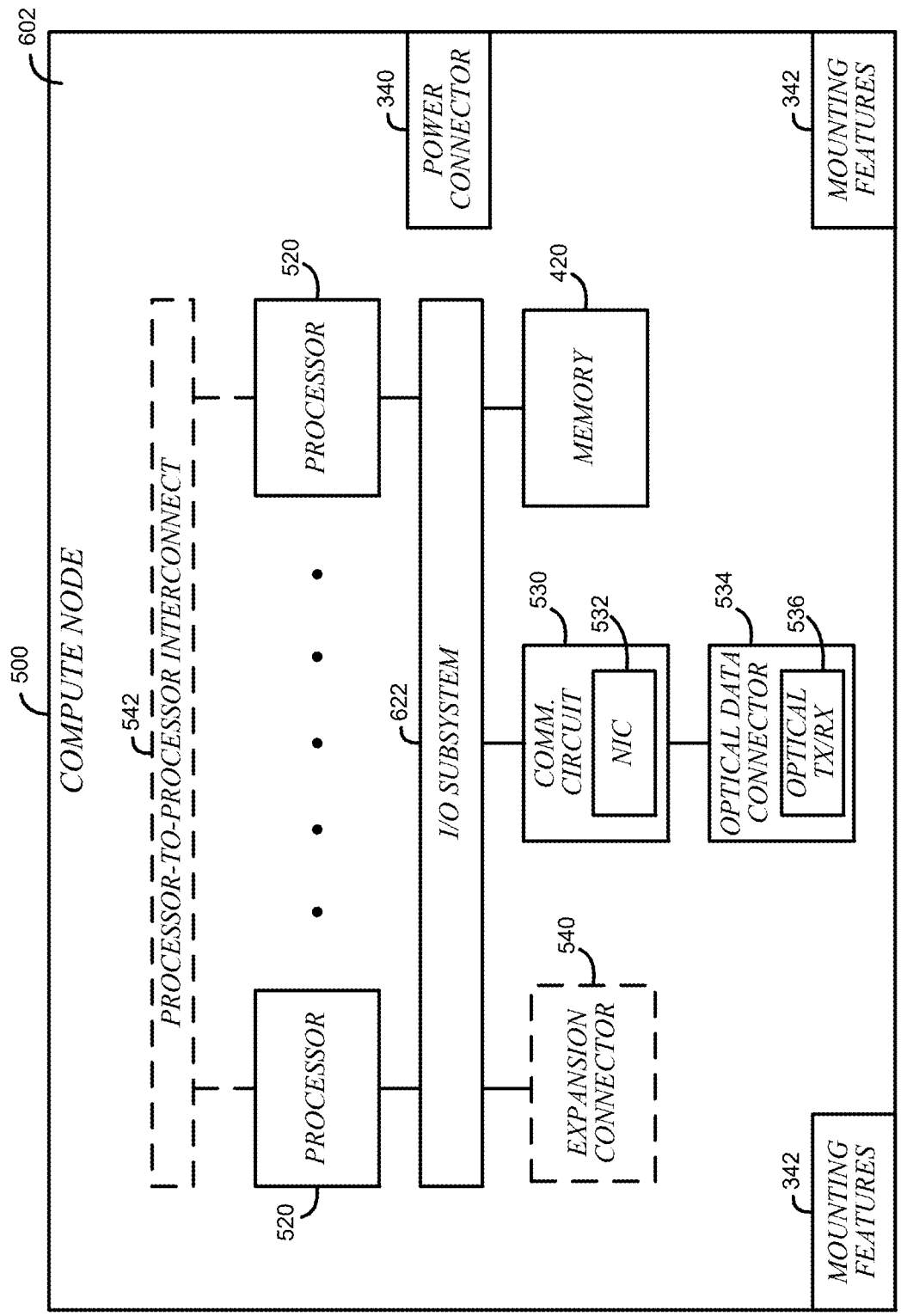
FIG. 5 is a simplified block diagram of at least one compute node.

Referring now to FIG. 5, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520. Illustratively, the processors 520 are embodied as high-performance processors 520 and may be configured to operate at a relatively high power rating.

The compute node 500 may also include a processor-to-processor interconnect 542. Processor-to-processor interconnect 542 may be embodied as any type of communication interconnect capable of facilitating processor-to-processor interconnect 542 communications. The processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an UltraPath Interconnect (UPI), or other high-speed point-to-point interconnect dedicated to processor-to-processor communications (e.g., PCIe or Compute Express Link (CXL)).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). NIC 532 may be embodied as part of a system-on-a-chip (SoC) that includes one or more processors, or included on a multichip package that also contains one or more processors. NIC 532 may include a local processor (not shown) and/or a local memory (not shown) that are both local to the NIC 532. The local processor of the NIC 532 may be capable of performing one or more of the functions of the processors 520. Additionally or alternatively, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU, GPU, GPGPU, or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534, the optical transceiver 536 may form a portion of the communication circuit 530.

Compute node 500 may also include an expansion connector 540. Expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
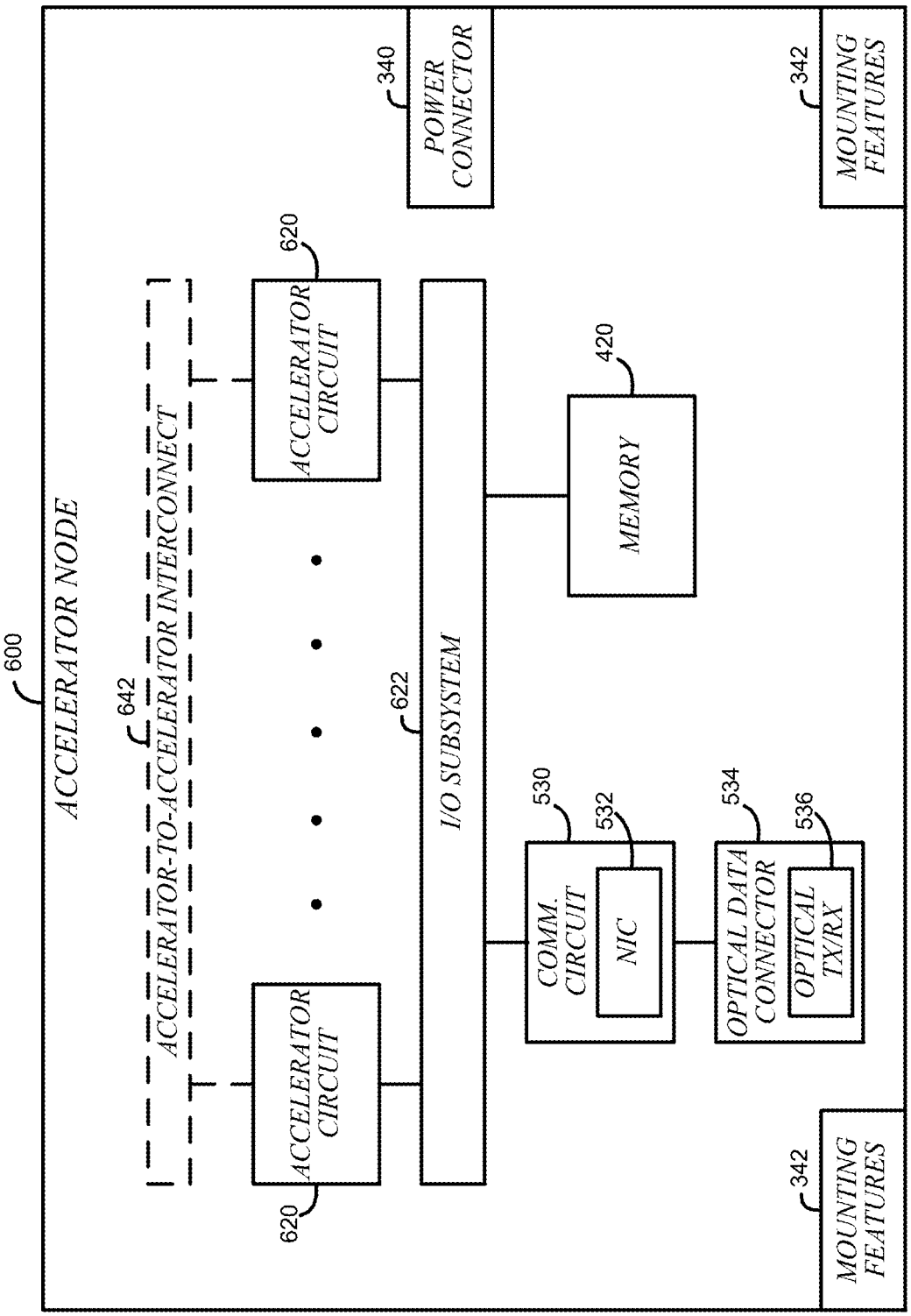
FIG. 6 is a simplified block diagram of at least one accelerator node usable in a data center.

Referring now to FIG. 6, the node 400 may be embodied as an accelerator node 600. The accelerator node 600 is configured to perform specialized compute tasks, such as machine learning, encryption, hashing, or other computational-intensive task. For example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

The accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. The accelerator-to-accelerator interconnect 642 can be embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. The accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
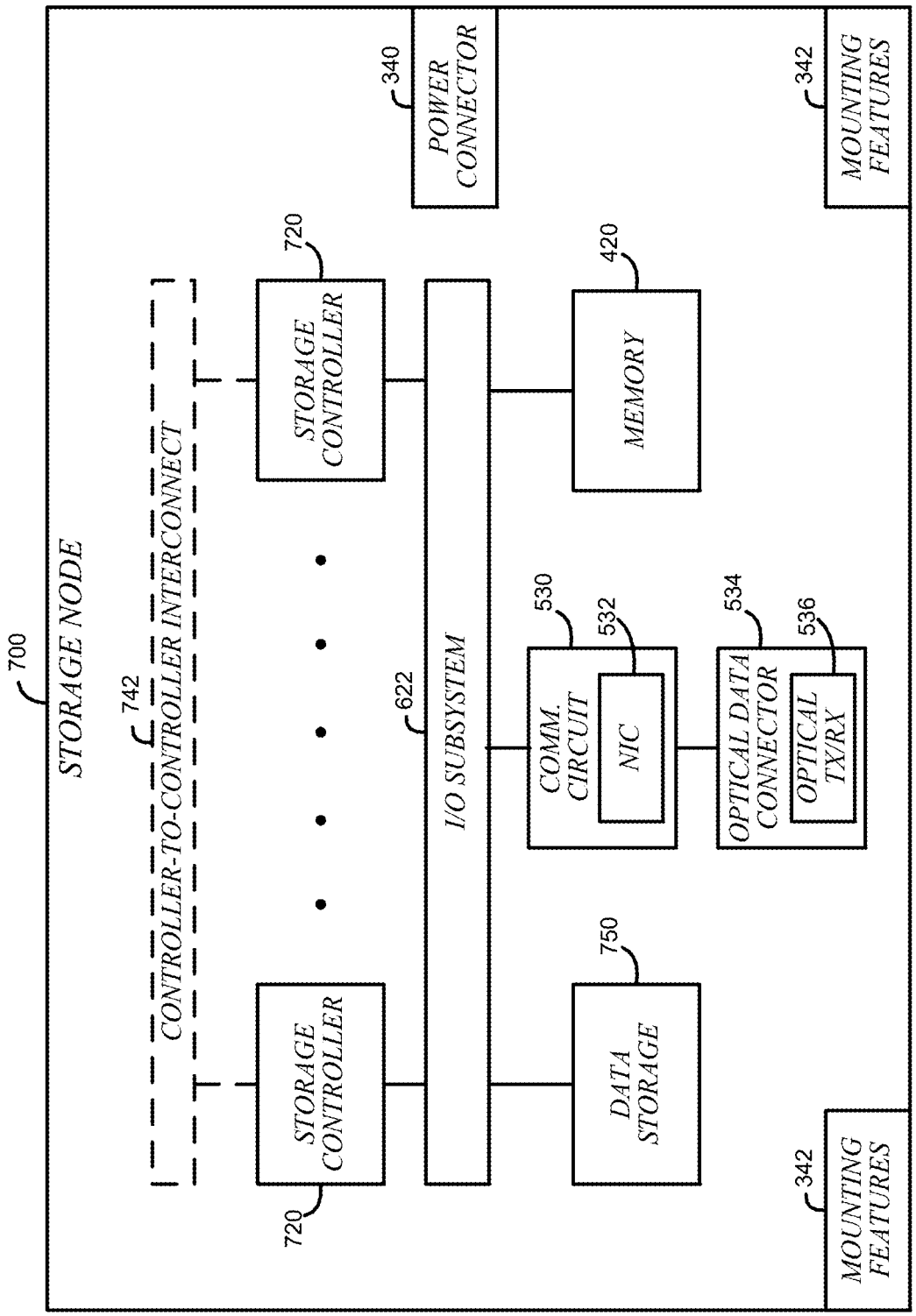
FIG. 7 is a simplified block diagram of at least one storage node usable in a data center.

Referring now to FIG. 7, node 400 may be embodied as a storage node 700. The storage node 700 is configured, to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720. The storage controllers 720 may be embodied as any type of processor, controller, or control circuit capable of controlling the storage and retrieval of data into the data storage 750 based on requests received via the communication circuit 530. The storage controllers 720 are embodied as relatively low-power processors or controllers.

The storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. The controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
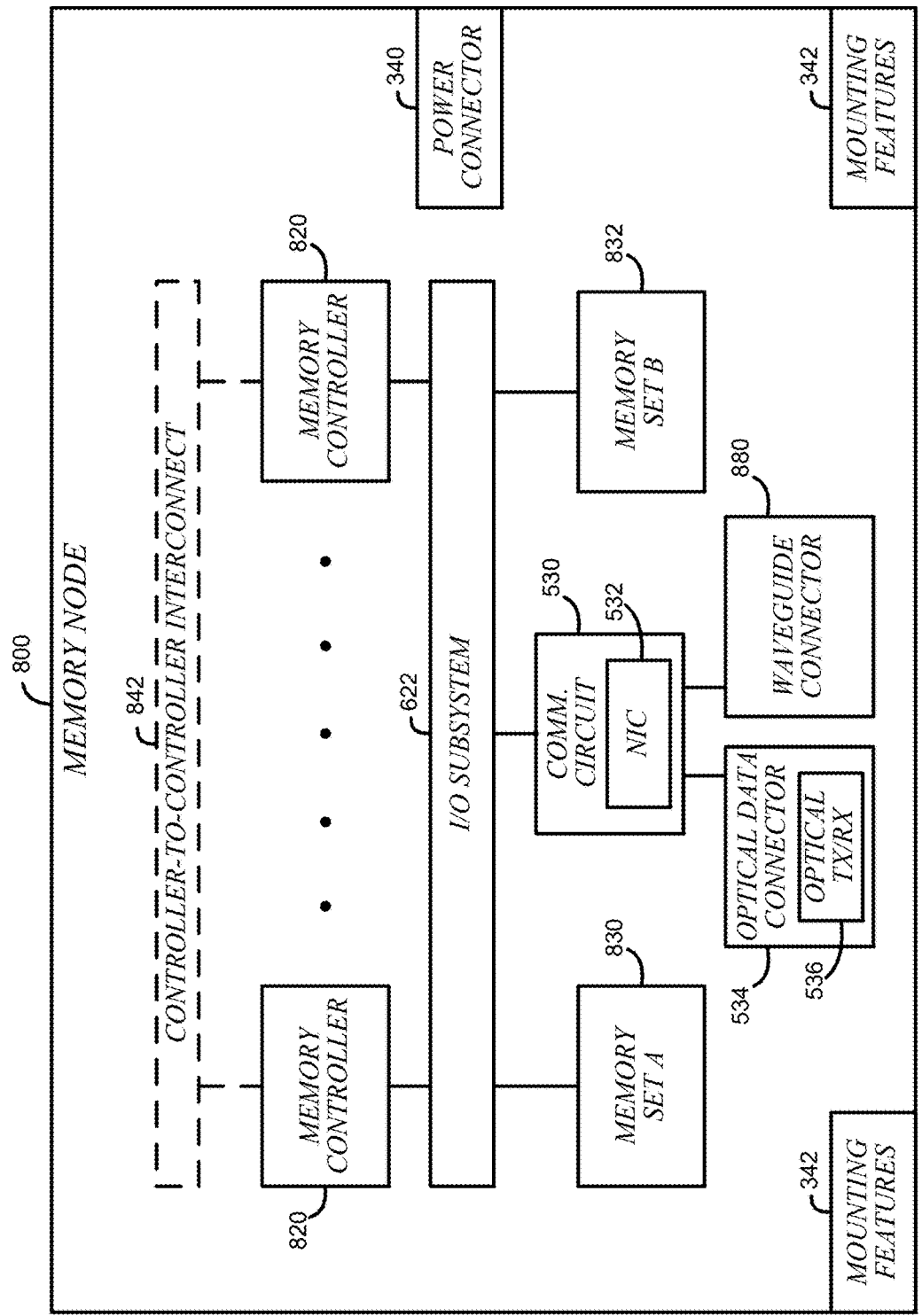
FIG. 8 is a simplified block diagram of at least one memory node usable in a data center.

Referring now to FIG. 8, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820. The memory controllers 820 may be embodied as any type of processor, controller, or control circuit capable of controlling the writing and reading of data into the memory sets 830, 832 based on requests received via the communication circuit 530. Memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

The memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. The controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, a memory controller 820 may access, through the controller-to-controller interconnect 842, memory that is within the memory set 832 associated with another memory controller 820. A scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). Memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency associated with performing memory access operations as compared to accessing contiguous memory addresses from the same memory device.

Memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
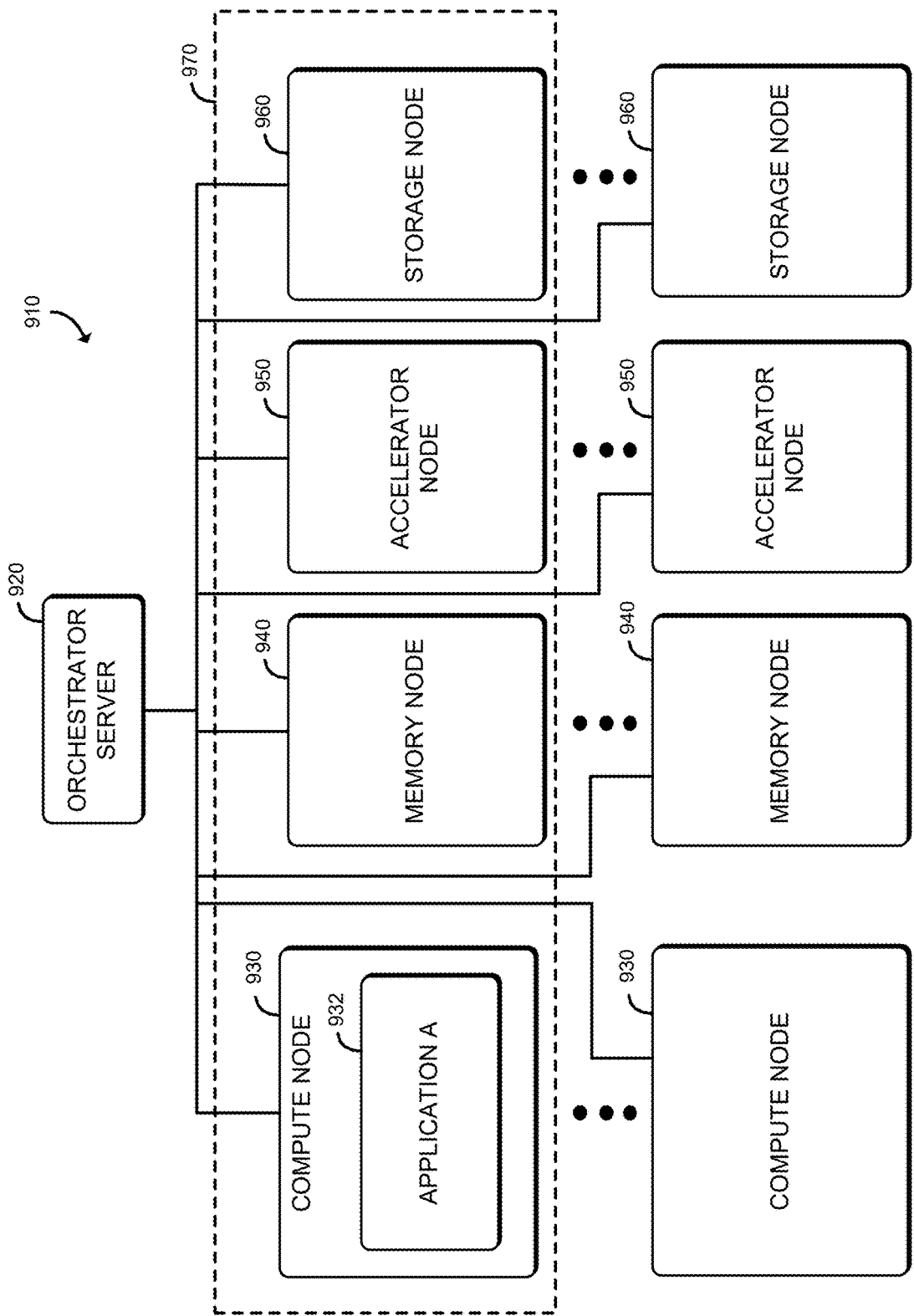
FIG. 9 depicts a system for executing one or more workloads.

Referring now to FIG. 9, a system for executing one or more workloads (e.g., applications) may be implemented. System 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., one or more similar to the compute node 500), memory nodes 940 (e.g., one or more similar to the memory node 800), accelerator nodes 950 (e.g., one or more similar to the memory node 600), and storage nodes 960 (e.g., one or more similar to the storage node 700). One or more of the nodes 930, 940, 950, 960 may be grouped into a managed node 970, such as by the orchestrator server 920, to collectively perform a workload (e.g., an application 932 executed in a virtual machine or in a container).

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node or at a time, and may exist regardless of whether a workload is presently assigned to the managed node. The orchestrator server 920 may selectively allocate and/or deallocate physical resources 320 from the nodes 400 and/or add or remove one or more nodes 400 from the managed node 970 as a function of quality of service (QOS) targets (e.g., a target throughput, a target latency, a target number instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in a node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, the orchestrator server 920 may identify trends in the resource utilization of the workload (e.g., the application 932), such as by identifying phases of execution (e.g., time periods in which different operations, one or more having different resource utilizations characteristics, are performed) of the workload (e.g., the application 932) and pre-emptively identifying available resources in the data center and allocating them to the managed node 970 (e.g., within a predefined time period of the associated phase beginning). The orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with one or more potential resource available in the data center 100 (e.g., the latency associated with the performance of the resource itself in addition to the latency associated with the path through the network between the compute node executing the workload and the node 400 on which the resource is located).

The orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among others, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. The orchestrator server 920 may identify patterns in resource utilization phases of the workloads and use the patterns to predict future resource utilization of the workloads.

To reduce the computational load on the orchestrator server 920 and the data transfer load on the network, the orchestrator server 920 may send self-test information to the nodes 400 to enable a node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Node 400 may then report back a simplified result (e.g., yes or no) to the orchestrator server 920, which the orchestrator server 920 may utilize in determining the allocation of resources to managed nodes.

Examples described herein can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge Network

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, homogeneous processors, and/or a memory pool.

An illustrative edge computing system may support and/or provide various services to endpoint devices (e.g., client user equipment (UEs)), one or more of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
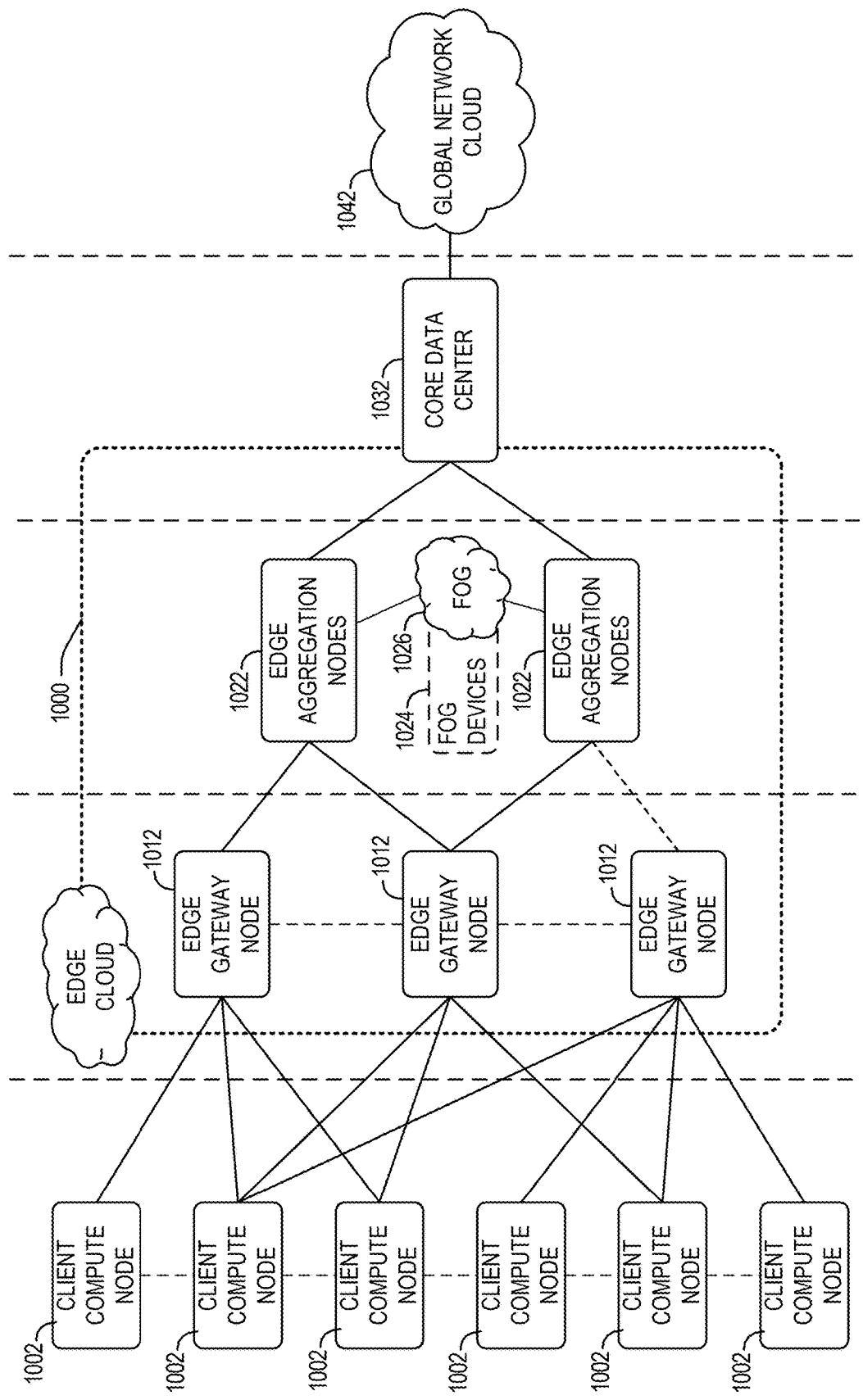
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location-deeper in the network-which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at one or more layers. Devices at a layer can be configured as peer nodes to another and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of network that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge cloud 1000, one or more edge entities can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
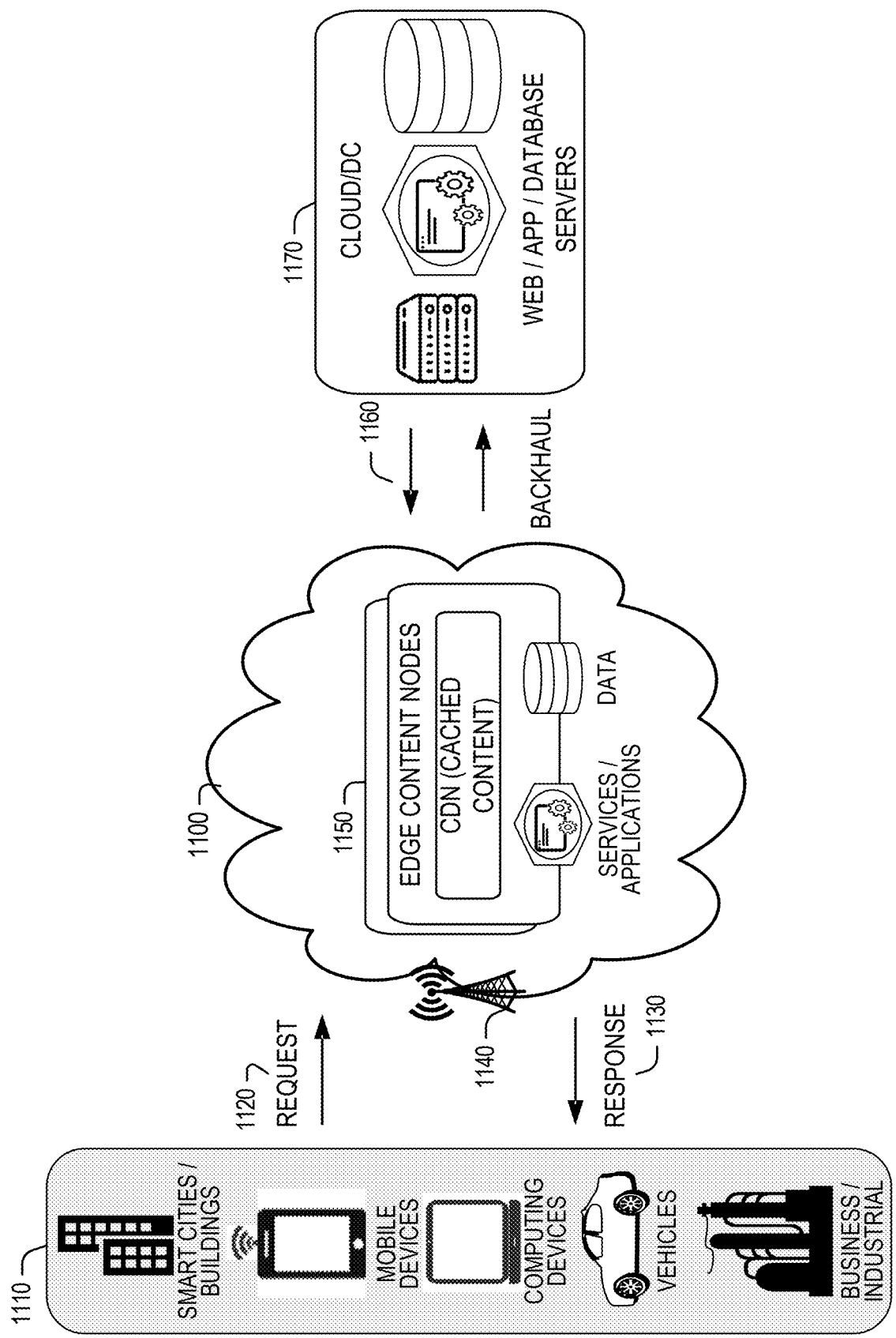
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). Within the edge cloud 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/data center for websites, applications, database servers, etc.

Examples described herein can be used in one or more examples of FIGS. 1-11 to allocate resources to perform one or more sections, stages or layers of a workload based on a complexity estimation from a pre-processing of data associated with the workload.

Pre-Processing Data to Determine Resources

Figure 12:
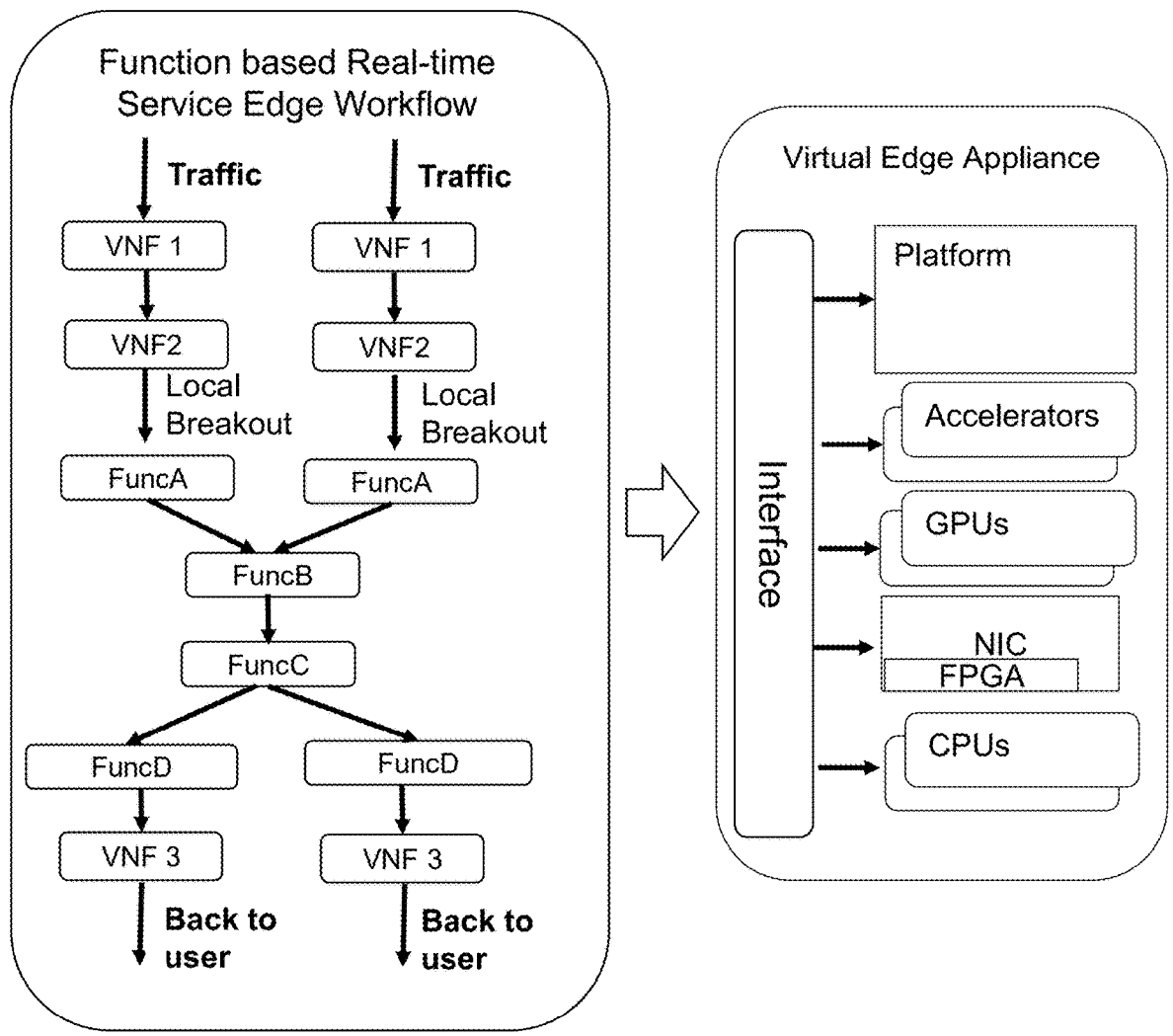
FIG. 12 depicts an example edge cloud base station system.

FIG. 12 depicts an example edge cloud base station system. Multiple virtual network functions (VNFs) and services execute on various devices and pooled accelerators. Thus, through dynamic platform resource compositions, such as composite nodes, services can have access to diverse accelerators with different compute and quality of service (QOS) properties. In this context, artificial intelligence (AI) training and inference processing can be performed by accelerator devices at virtual edge appliances. In some cases, orchestration and resource management to perform services in accordance with QoS using software may be limited in scaling up if a number of services increases, and may not achieve real time performance requirements according to applicable QoS. In other words, as a number and variety of available accelerators and compute options increases, management of performance of services when an array of available accelerators and compute options is available may not achieve desired time-to-completion. One or more examples herein can be used in a communications base station such as but not limited to a 5G base station.

A platform architecture can be configured to generate meta-data indicative of processing resources to allocate for subsequent data processing to achieve applicable QoS. A workload request can trigger execution of one or more scheduling policies to select one or more accelerators and other device resources to allocate to perform a particular stage of a multiple level processing of data based on a QoS or service level agreement (SLA). A level of complexity to process data in a subsequent level or layer and output meta-data can be determined or estimated. Meta-data can indicate an estimated level of complexity or amount of computation to perform a subsequent level or layer of processing. For example, a neural network can have different layers that utilize different hardware resources to complete a layer of processing and pre-processing data of a workload request can identify various hardware resource configuration that could be used to perform the layer of processing within the applicable QoS or SLA. For a particular layer of processing, resource consumption can depend on a level of computation to be performed and pre-processing the data can identify a level of computation to allocate to perform processing of the layer. Latency of a completion of a layer can depend on the selected accelerator(s) or computing devices and load on the selected accelerator(s) or computing devices.

For example, examples can be used for artificial intelligence (AI) inference solutions where the complexity of phase N+1 typically depends on processing at phase N. Various examples, of AI inference include, but are not limited to: surveillance operations where person detection occurs at phase N and person identification occurs at phase N+1; smart cities where car detection occurs at phase N and license plate identification occurs at phase N+1; and speech analytics where speech to text occurs at phase N and natural language processing (NLP) occurs at phase N+1.

Figure 13:
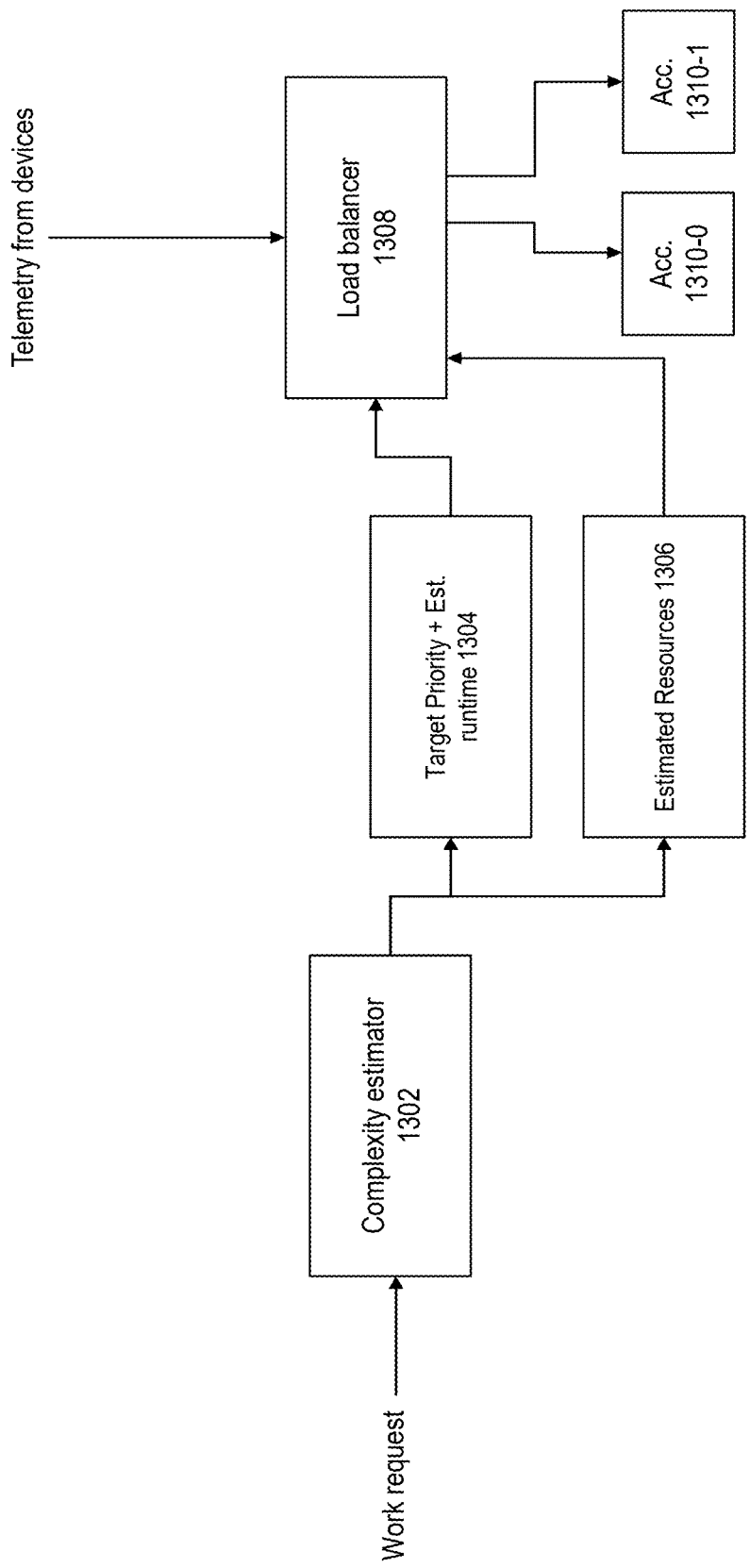
FIG. 13 depicts an example system.

FIG. 13 depicts an example system. During, before, or after a processing stage of one or more processing stages, complexity of a subsequent processing stage can be estimated and determined and the complexity determination can be provided to a scheduler to determine hardware resources to utilize to perform the subsequent processing stage. Pre-processing can be performed for an AI or machine learning (ML) neural network that utilizes multiple layers and before scheduling hardware resources to perform processing associated with a layer.

A work request received at a platform or originated at the platform may identify an AI model type associated to be performed for the request and an SLA. The SLA may specify one or more of: AI model type, time to complete a pre-processing model, time to complete processing and make data available after a particular processing layer or stage, minimum compute resources, minimum network interface bandwidth to be allocated, minimum compute resources, minimum memory read or write rates. Examples of types of target operations include, but are not limited, to: person detection, object detection, music detection, and so forth. In response to receipt of a request to perform AI or ML inference, complexity estimator 1302 can identify a pre-processing model to be executed for the operation targeted by the request. For example, if the request indicates an AI model type includes identification of a person, complexity estimator 1302 could identify an associated pre-processing model of person detection and provides inputs to the person detection model that include a pointer to a payload to process and an SLA parameter for the acceleration function.

By performing the pre-processing model, complexity estimator 1302 can identify hardware resources to perform a subsequent layer or stage to satisfy the provided SLA from various of hardware resources (e.g., FPGA accelerators, memory, network, CPU, XPU, GPU, IPU, DPU, and so forth) available to access from the platform. Complexity estimator 1302 can output meta-data that indicates a complexity level for one or more layers performed for the request. A complexity level can include target priority and estimated runtime 1304 and estimated resources 1306. For example, target priority and estimated runtime 1304 can indicate one or multiple devices and a time to completion for a subsequent phase. For example, target priority and estimated runtime 1304 can indicate accelerator device Accel0 can complete processing a subsequent phase in 10 milliseconds (ms), accelerator device Accel1 can complete processing a subsequent phase in 15 ms, and a CPU can complete the subsequent phase in 100 ms. For example, estimated resources 1306 can indicate hardware resources to allocate to complete the subsequent phase in the specified time to complete processing. For example, Accel0 can utilize allocation of N number of accelerators and M memory bandwidth to complete processing a subsequent phase in 10 ms; Accel1 can utilize allocation of P number of accelerators and Q memory bandwidth complete processing a subsequent phase in 15 ms; and use of a CPU can utilize R cores running at S frequency and T memory bandwidth complete processing a subsequent phase in 100 ms.

Load balancer 1308 may select from identified device resource allocations meta-data allocate the one or more hardware resources to perform the operations. Load balancer 1308 can implement one or more policies based on an applicable SLA to select one or more hardware resources identified in the meta-data to perform the target accelerated operation. Load balancer 1308 may receive telemetry from hardware resources and determine a level of resources available (e.g. memory or storage space availability, memory bandwidth availability, compute capacity, number of available cores, accelerator resource availability, network device bandwidth availability, device temperatures and whether temperatures are near limits, etc.). Load balancer 1308 may estimate resources requirements to perform a next phase and decide which of the available hardware resources has a minimum available resources.

Figure 14:
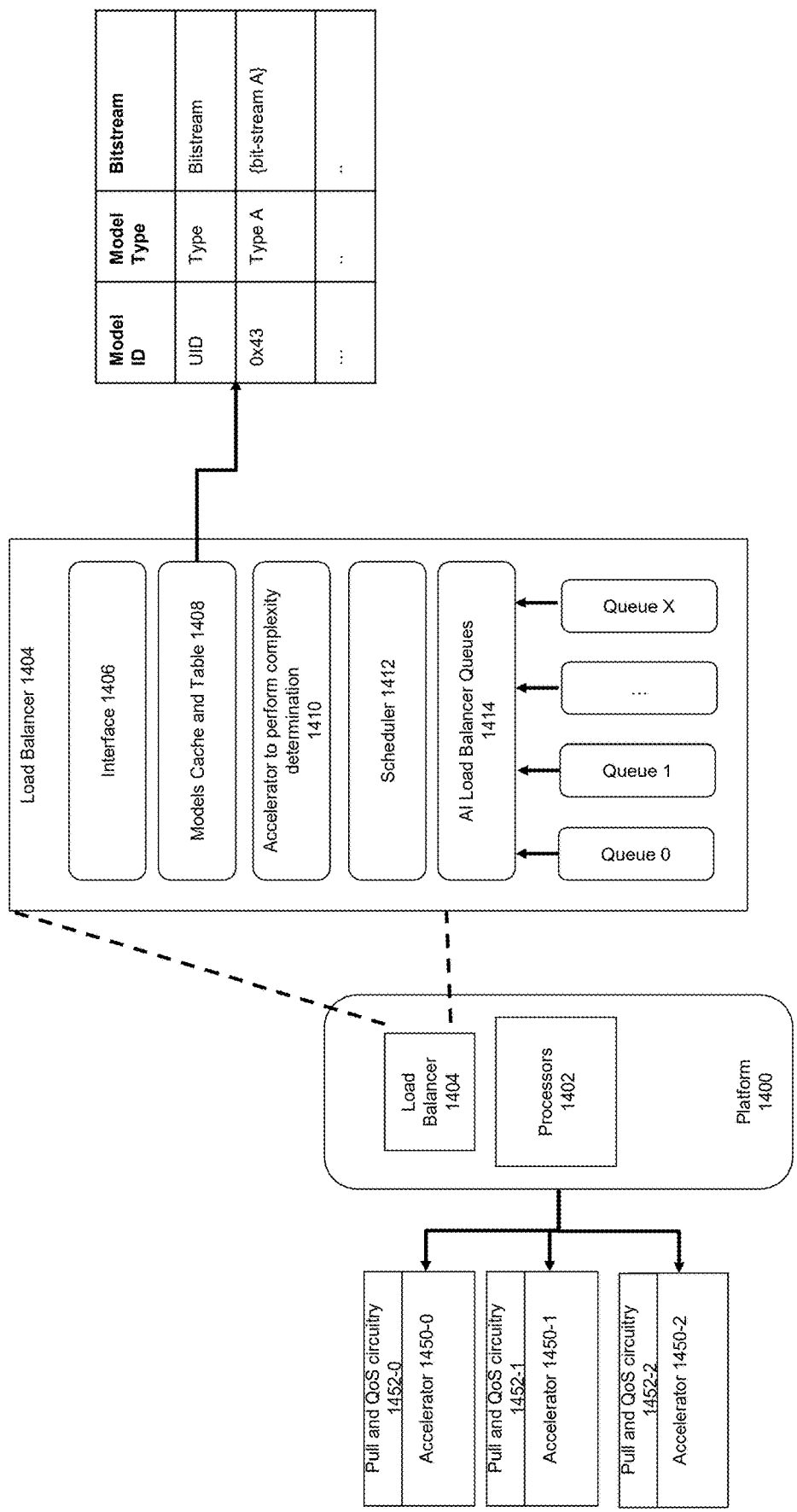
FIG. 14 depicts an example system.

FIG. 14 depicts an example system. Load balancer 1404 to pre-process a workload and identify one or more combinations of hardware resources and configurations to perform one or more operations of layers of a multiple stage data processing to attempt to achieve applicable SLA parameters associated with the one or more layers. In some examples, the same or different implementations (e.g., different microservice or software) of a layer can be executed by different devices. For example, load balancer 1404 can be implemented in one or more of: CPU, GPU, GPGPU, XPU, Quick Assist Technology (QAT), hardware queue manager (HQM), work scheduler, IPU, NIC, SmartNIC, software, container, virtual machine, or any other part of a platform.

Interface 1406 can be accessible from an operating system or driver and accessible by any software stack. Interface 1406 can permit a requester (e.g., device, orchestrator, application, container, virtual machine (VM), and so forth) to specify one or more of: (a) model identifier (ID); (b) model type; or (c) a bit-stream or binary associated with that model. For example, interface 1406 can include an application program interface (API), command line interface (CLI), script, binary, kernel, and so forth. For instance, a model type could be person detection, object detection, speech-to-text, image recognition, and so forth. In some examples, the type could be a unique ID type used to match the request to a bitstream. The bitstream could be provided with the request or accessed from memory by a pointer. The bit-stream can include data that defines a kernel that is executable by a device (e.g., accelerators 0 to 2) to perform one or more operations. For example, a bit stream may include instructions for performing a cryptographic operation (e.g., encryption or decryption), an arithmetic operation, a hashing operation, and/or other operations. A requester can provide one or more of: (i) pointer to the payload associated with the request; (ii) associated SLA for the offloaded processing operation; (iii) model type associated with a pre-processing phase; and/or (iv) pointer to memory area where the result of the pre-processing is to be stored and where the load balancer or accelerator can fetch the meta-data generated by pre-processing. The transaction or request can be part of a service function chain (SFC) that includes a sequence of operations, or a microservice in some examples.

Models cache and table 1408 can store information provided with the request. In examples, models cache and table 1408 can register a model by identifying a model identifier (ID) and its executable bitstream. Different binaries can execute on different accelerator devices in some examples and accordingly multiple binaries can be associated with a particular model type.

Interface 1406 can provide transactions or requests from one or more requesters into a queue among queues 0 to X to store a sequence of jobs to execute. In some examples, a queue can be associated with one or multiple accelerators among accelerators 1450-0 to 1450-2. Although three accelerators are shown, any number of accelerators or other devices can be used.

Accelerator to perform complexity determination 1410 can execute a binary of a pre-processing model. Accelerator to perform complexity determination 1410 can be implemented as any type of processor described herein. For example, a binary can indicate a complexity to measure and outputs a complexity factor. Complexity factor can to indicate hardware resource allocations needed to satisfy an SLA for different types of hardware devices such as execution on GPU, FPGA, CPU, and so forth.

Inputs to the pre-processing model can include the payload to be processed, the relevant SLA parameters and a pointer to a memory region meta-data is to be stored. Meta-data can indicate one or more configuration of resources to satisfy the provided SLA based on the various devices and accelerators connected to the platform. For example, meta-data can include a complexity factor that indicates a configuration of compute resources that could be used to complete a work based on an appliable SLA. For example, for a data set that is identified by pre-processing to not be sparse, a next layer can be executed on CPU to satisfy an SLA whereas a data set that is identified by pre-processing to be sparse, a next layer can be executed on an accelerator (e.g., FPGA).

Accelerator 1410 can enqueue a request after pre-processing the request and its data to determine a complexity of a job to a corresponding queue. Meta-data can be enqueued in a queue among queues 0 to X for access by one or more hardware resources. A set of queues can be devoted to store already pre-processed request for the various types of models (e.g., AI models). In some examples, a single queue can be used to store work requests for different AI models and/or multiple queues can be used where a queue is associated with performance of a particular AI model type. For example, a queues can be associated with a particular type of target operation.

Work requests can be in stored in a queue in order or out of order of execution by a device. A request can have an associated time stamp when it was inserted in queue and an associated SLA parameter(s) and the resource requirement meta-data. Scheduler 1412 can schedule performance of requests in order to try to achieve associated SLA parameter(s).

An accelerator among accelerators 1450-0 to 1450-2 can provide an input of a current amount of available resources to scheduler 1412 and type of accelerated function that it can execute and retrieve or pull content from one or more queues among queues 0 to X. For example, for accelerators 1450-0 to 1450-2, respective pull and QoS circuitry 1452-0 to 1452-2 can be used to provide an input of a current amount of available resources to scheduler 1412 and type of accelerated function that it can execute and retrieve or pull content from one or more queues among queues 0 to X. An accelerator among accelerators 1450-0 to 1450-2 can retrieve or pull the meta-data generated by accelerator 1410 to determine an amount of resources to perform satisfy applicable QoS and SLAs. In some examples, pull and QoS circuitry of an accelerator can allocate accelerator resources, memory resources, and/or networking bandwidth to perform a workload.

In some examples, scheduler 1412 can process requests to retrieve meta-data and work requests from one or more of accelerators 1450-0 to 1450-2 and decide which device is to execute a model based on QoS and/or SLA and select a device to execute model based on complexity (e.g., compute resources required to complete work to perform in required time, number of uncompleted jobs, processing speed (e.g., flops/second), and/or time to complete a particular layer according to QoS or SLA. In some examples, different combinations of resource requirements can be specified for an accelerator to achieve different levels of an SLA and load balancer may determine to delay performance of a request (e.g., by 100 ns) at the expense utilizing 10% more of accelerator resource to satisfy an applicable SLA parameter. In some cases, scheduler 1412 can register or de-register models depending respective available hardware resources or lack of available hardware resources.

Figure 15:
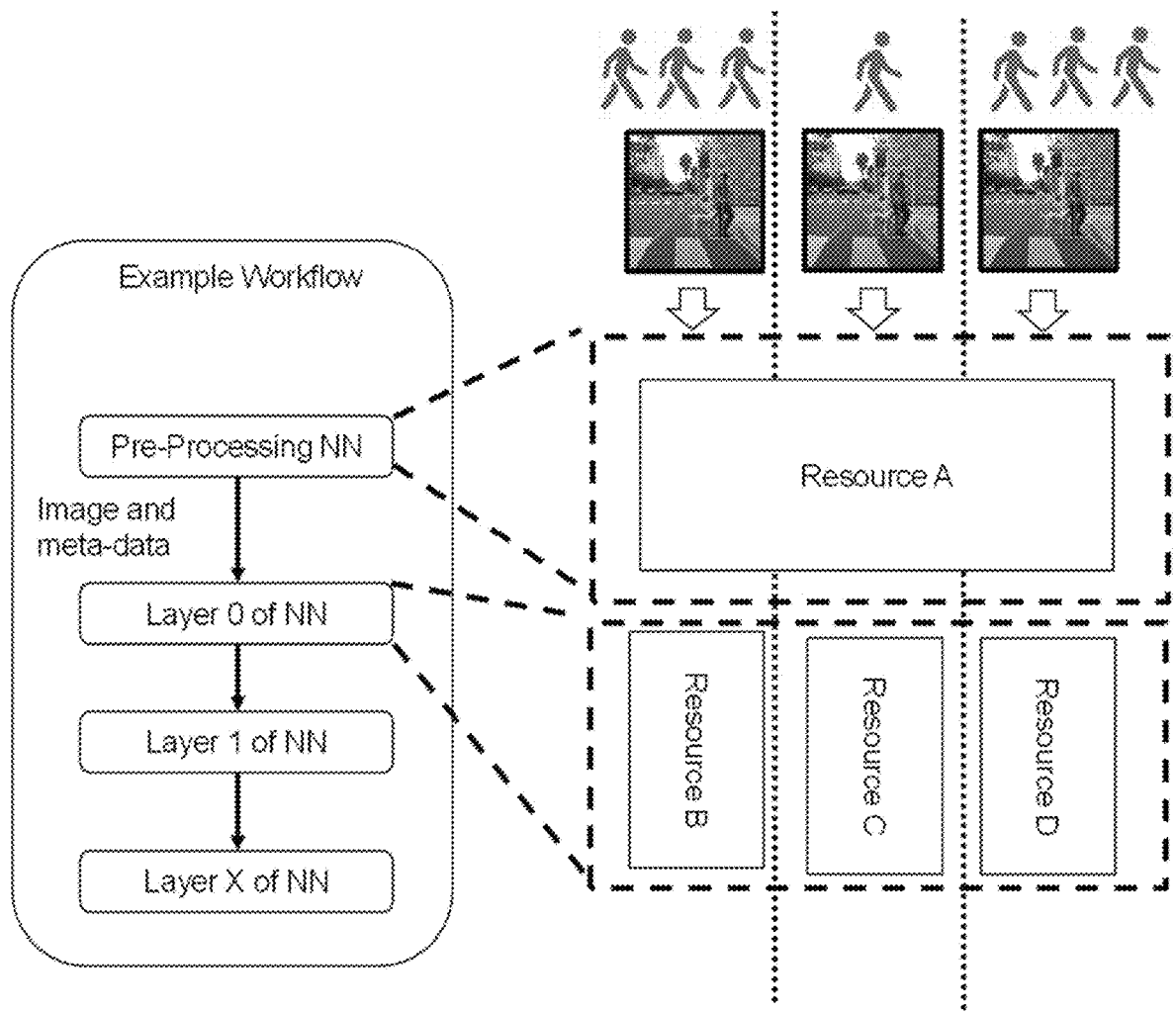
FIG. 15 depicts an example operation of a system.

FIG. 15 depicts an example operation. In a surveillance and person identification AI model, pre-processing NN can determine complexity of surveillance and person identification to be performed in layer 0. For example, pre-processing NN can determine a number of persons in the image. In this example, Resource A is used to perform pre-processing NN and can utilize 2 GB/s of DDR memory and 2 vision processing unit (VPU) cores). Pre-processing can generate different combinations of resource requirements for the same accelerators providing different levels of SLA. For example, Resources B-D can be identified where Resource B includes 2 Gbps DDR memory and 2 VPU cores, Resource C includes 0.5 Gbps DDR memory and 1 VPU core, and Resource D includes 3.5 Gbps DDR memory and 5 VPU cores.

Layer 0 of the NN can identify the specific individuals that may match one or more of the identified persons and Layer 1 and Layer X can perform other operations. In this example, Layer 0 of NN has different level of compute requirements depending on the meta-data generated in the pre-processing NN layer. Hence, resources can be allocated prior to execution of the first and/or second phase in order to meet the required SLA (e.g., 40 fps). In some cases, the SLA may change over time for the stream depending external facts such as camera location, flow of people being analyzed, etc., and resources allocated to achieve the SLA can be adjusted accordingly.

Figure 16:
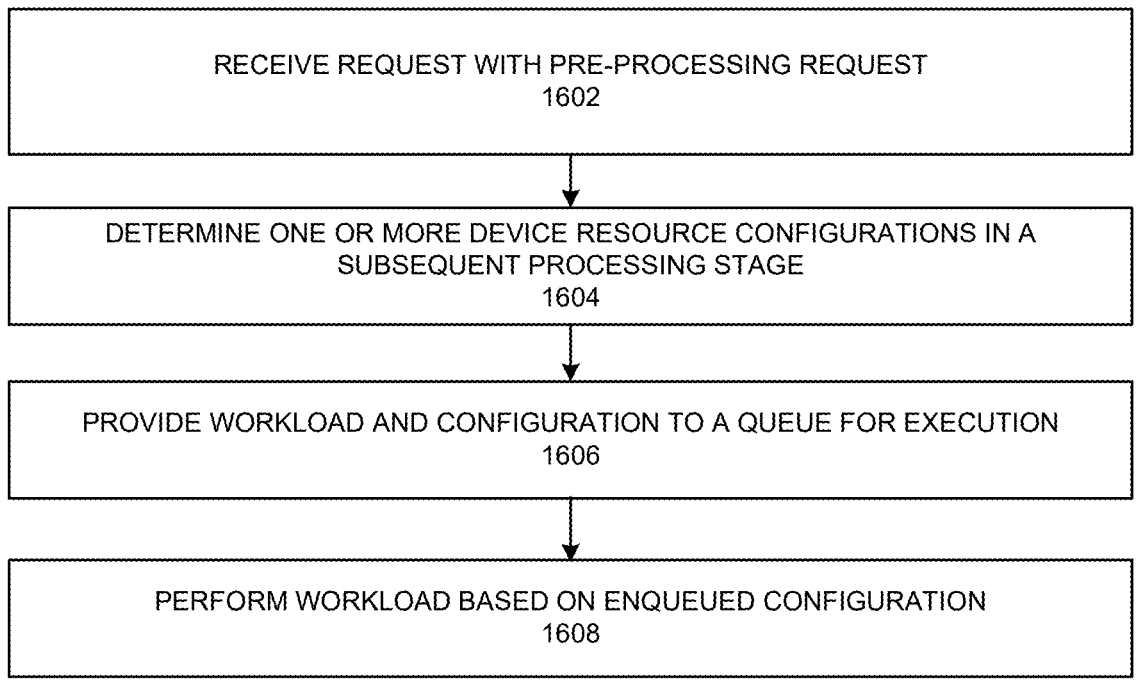
FIG. 16 depicts an example process.

FIG. 16 depicts an example process. The process can be performed by a device that determines processing to determine one or more configurations of device resources to select from to perform a subsequent layer of processing. At 1602, a request can be received at a pre-processing stage to perform processing of data. In some examples, the request includes a binary that is performed in a pre-processing stage and the request can include an SLA. At 1604, the pre-processing stage can estimate or determine device resources to complete a next stage within a requirement of an applicable SLA. For example, one or multiple configurations of device resources can be provided by the pre-processing stage. The one or multiple configurations of device resources can be indicated in meta-data.

At 1606, a workload associated with the request can be provided to a queue with pre-processing meta-data. The compute resources associated with the workload can be indicated in the meta-data. In some examples, a hardware device can allocate resources to perform the workload. A queue can be associated with a particular AI model type in some examples. At 1608, a device can read the queue to identify a workload to perform. The device can be configured to allocate hardware resources specified in the meta-data and perform the workload. Performing the workload can generate data that can be processed by a subsequent layer or made available to the requester.

Figure 17:
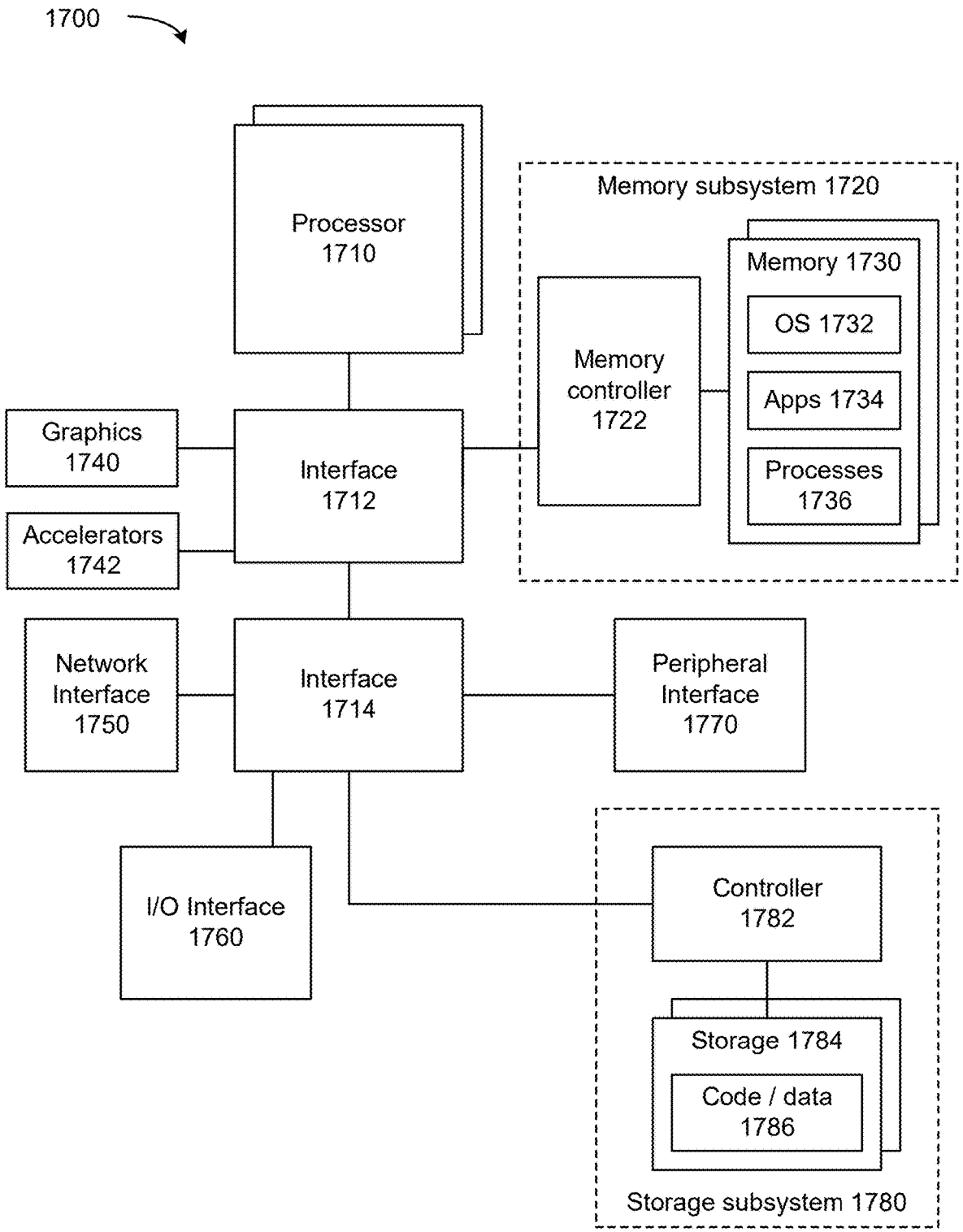
FIG. 17 depicts an example system.

FIG. 17 depicts an example computing system. System 1700 can determine one or more configurations of hardware to perform a stage or a workload in accordance with one or more embodiments described herein. System 1700 includes processor 1710, which provides processing, operation management, and execution of instructions for system 1700. Processor 1710 can include any type of microprocessor, central processing unit (CPU), graphics processing unit (GPU), vision processing unit (VPU), processing core, or other processing hardware to provide processing for system 1700, or a combination of processors. Processor 1710 controls the overall operation of system 1700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1700 includes interface 1712 coupled to processor 1710, which can represent a higher speed interface or a high throughput interface for system components that needs higher bandwidth connections, such as memory subsystem 1720 or graphics interface components 1740, or accelerators 1742. Interface 1712 represents an interface circuit, which can be a standalone component or integrated onto a processor die. Where present, graphics interface 1740 interfaces to graphics components for providing a visual display to a user of system 1700. In one example, graphics interface 1740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1740 generates a display based on data stored in memory 1730 or based on operations executed by processor 1710 or both. In one example, graphics interface 1740 generates a display based on data stored in memory 1730 or based on operations executed by processor 1710 or both.

Accelerators 1742 can be a fixed function or programmable offload engine that can be accessed or used by a processor 1710. For example, an accelerator among accelerators 1742 can provide compression (DC) capability, cryptography services such as public key encryption (PKE), cipher, hash/authentication capabilities, decryption, or other capabilities or services. In addition or alternatively, an accelerator among accelerators 1742 provides field select controller capabilities as described herein. In some cases, accelerators 1742 can be integrated into a CPU socket (e.g., a connector to a motherboard or circuit board that includes a CPU and provides an electrical interface with the CPU). For example, accelerators 1742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1720 represents the main memory of system 1700 and provides storage for code to be executed by processor 1710, or data values to be used in executing a routine. Memory subsystem 1720 can include one or more memory devices 1730 such as read-only memory (ROM), flash memory, one or more varieties of random access memory (RAM) such as DRAM, or other memory devices, or a combination of such devices. Memory 1730 stores and hosts, among other things, operating system (OS) 1732 to provide a software platform for execution of instructions in system 1700. Additionally, applications 1734 can execute on the software platform of OS 1732 from memory 1730. Applications 1734 represent programs that have their own operational logic to perform execution of one or more functions. Processes 1736 represent agents or routines that provide auxiliary functions to OS 1732 or one or more applications 1734 or a combination. OS 1732, applications 1734, and processes 1736 provide software logic to provide functions for system 1700. In one example, memory subsystem 1720 includes memory controller 1722, which is a memory controller to generate and issue commands to memory 1730. It will be understood that memory controller 1722 could be a physical part of processor 1710 or a physical part of interface 1712. For example, memory controller 1722 can be an integrated memory controller, integrated onto a circuit with processor 1710.

In some examples, OS 1732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 1700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1700 includes interface 1714, which can be coupled to interface 1712. In one example, interface 1714 represents an interface circuit, which can include standalone components and integrated circuitry. In one example, multiple user interface components or peripheral components, or both, couple to interface 1714. Network interface 1750 provides system 1700 the ability to communicate with remote devices (e.g., servers or other computing devices) over one or more networks. Network interface 1750 can include an Ethernet adapter, wireless interconnection components, cellular network interconnection components, USB (universal serial bus), or other wired or wireless standards-based or proprietary interfaces. Network interface 1750 can transmit data to a device that is in the same data center or rack or a remote device, which can include sending data stored in memory. Network interface 1750 can receive data from a remote device, which can include storing received data into memory.

In one example, system 1700 includes one or more input/output (I/O) interface(s) 1760. I/O interface 1760 can include one or more interface components through which a user interacts with system 1700 (e.g., audio, alphanumeric, tactile/touch, or other interfacing). Peripheral interface 1770 can include any hardware interface not specifically mentioned above. Peripherals refer generally to devices that connect dependently to system 1700. A dependent connection is one where system 1700 provides the software platform or hardware platform or both on which operation executes, and with which a user interacts.

In one example, system 1700 includes storage subsystem 1780 to store data in a nonvolatile manner. In one example, in certain system implementations, at least certain components of storage 1780 can overlap with components of memory subsystem 1720. Storage subsystem 1780 includes storage device(s) 1784, which can be or include any conventional medium for storing large amounts of data in a nonvolatile manner, such as one or more magnetic, solid state, or optical based disks, or a combination. Storage 1784 holds code or instructions and data 1786 in a persistent state (e.g., the value is retained despite interruption of power to system 1700). Storage 1784 can be generically considered to be a "memory," although memory 1730 is typically the executing or operating memory to provide instructions to processor 1710. Whereas storage 1784 is nonvolatile, memory 1730 can include volatile memory (e.g., the value or state of the data is indeterminate if power is interrupted to system 1700). In one example, storage subsystem 1780 includes controller 1782 to interface with storage 1784. In one example controller 1782 is a physical part of interface 1714 or processor 1710 or can include circuits or logic in both processor 1710 and interface 1714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. The NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1700. More specifically, power source typically interfaces to one or multiple power supplies in system 1700 to provide power to the components of system 1700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein can be part of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternatives. Furthermore, additional operations may be added or removed depending on the particular applications. Any combination of changes can be used and one of ordinary skill in the art with the benefit of this disclosure would understand the many variations, modifications, and alternatives thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Performing a first processing of data in a multi-level neural network (NN), where performing the first processing of data includes generating meta-data indicative of an amount of processing for a second processing of the data in the multi-level NN; selecting one or more hardware resources for performance of the second processing of the data; and performing, by the selected one or more hardware resources, the second processing of the data in the multi-level NN, wherein one or more hardware resources utilized by the second processing is different than one or more hardware resources utilized by the first processing.

Example 1 includes a method comprising: receiving a workload request to perform a pre-processing operation and at least one service level agreement (SLA) parameter and performing the pre-processing operation associated with the workload request and the at least one SLA parameter to determine multiple configurations of hardware resources to perform a workload associated with the workload request in a subsequent stage.

Example 2 includes one or more examples, wherein the pre-processing operation comprises an executable binary referenced by the workload request.

Example 3 includes one or more examples, and includes: storing, in a queue, the multiple configurations of hardware resources to perform a workload associated with the workload request in the subsequent stage, wherein the multiple configurations of hardware resources are available for access by one or more accelerator devices to perform the workload.

Example 4 includes one or more examples, and includes: selecting one or more hardware resources for performance of the workload associated with the workload request among the multiple configurations of hardware resources.

Example 5 includes one or more examples, wherein the subsequent stage comprises a data processing stage in a neural network (NN).

Example 6 includes one or more examples, wherein the workload associated with the workload request in the subsequent stage comprises a machine learning (ML) inference operation.

Example 7 includes one or more examples, and includes a non-transitory computer-readable medium comprising instructions stored thereon, that if executed by one or more processors, cause the one or more processors to: determine multiple configurations of hardware resources to perform a workload associated with a workload request in a subsequent stage based on a pre-processing operation associated with the workload request and at least one service level agreement (SLA) parameter associated with the workload request.

Example 8 includes one or more examples, wherein an executable binary is associated with the workload request and execution of the executable binary performs the pre-processing operation.

Example 9 includes one or more examples, and includes instructions stored thereon, that if executed by one or more processors, cause the one or more processors to: store the multiple configurations of hardware resources to perform a workload associated with the workload request in a subsequent stage, wherein the multiple configurations of hardware resources are available for access by one or more accelerator devices to perform the workload.

Example 10 includes one or more examples, and includes instructions stored thereon, that if executed by one or more processors, cause the one or more processors to: select one or more hardware resources for performance of the workload associated with the workload request based on one or more of the multiple configurations of hardware resources.

Example 11 includes one or more examples, wherein the subsequent stage comprises a data processing stage in a neural network (NN).

Example 12 includes one or more examples, wherein the workload associated with the workload request in a subsequent stage comprises a machine learning (ML) inference operation.

Example 13 includes one or more examples, and includes a system comprising: at least one processor and circuitry to: determine multiple configurations of hardware resources to perform a workload associated with a workload request in a subsequent stage based on a pre-processing operation associated with the workload request and at least one service level agreement (SLA) parameter associated with the workload request.

Example 14 includes one or more examples, wherein an executable binary is associated with the workload request and execution of the executable binary performs the pre-processing operation.

Example 15 includes one or more examples, wherein a processor of the at least one processor is to execute the executable binary.

Example 16 includes one or more examples, wherein the circuitry is to: store the multiple configurations of hardware resources to perform a workload associated with the workload request in a subsequent stage, wherein the multiple configurations of hardware resources are available for access by one or more accelerator devices to perform the workload.

Example 17 includes one or more examples, wherein the circuitry is to: select one or more hardware resources for performance of the workload associated with the workload request based on one or more of the multiple configurations of hardware resources.

Example 18 includes one or more examples, wherein the workload associated with the workload request in a subsequent stage comprises a machine learning (ML) inference operation.

Example 19 includes one or more examples, and includes a non-transitory computer-readable medium comprising instructions stored thereon, that if executed by one or more processors, cause the one or more processors to: receive a workload request to perform a pre-processing operation and at least one service level agreement (SLA) parameter and cause performance of the pre-processing operation associated with the workload request and the at least one SLA parameter to determine multiple configurations of hardware resources to perform a workload associated with the workload request in a subsequent stage.

Example 20 includes one or more examples, and includes instructions stored thereon, that if executed by one or more processors, cause the one or more processors to: store the multiple configurations of hardware resources to perform a workload associated with the workload request in a subsequent stage, wherein the multiple configurations of hardware resources are available for access by one or more accelerator devices to perform the workload and select one or more hardware resources for performance of the workload associated with the workload request based on one or more of the multiple configurations of hardware resources.

The invention claimed is:

1. A method comprising:
receiving a request to perform a pre-processing operation and at least one service level agreement (SLA) parameter;
determining a first configuration of hardware resources to allocate to perform operations of a first layer of a neural network (NN) associated with the request based on the at least one SLA parameter prior to scheduling and performance of the first layer of the NN by performing a pre-processing operation associated with the request;
performing the operations of the first layer of the NN by use of the first configuration of the allocated hardware resources;
determining a second configuration of hardware resources to allocate to perform operations of a second layer of the NN associated with the request based on the at least one SLA parameter prior to scheduling and performance of the second layer of the NN by performing a second pre-processing operation associated with the request; and
performing the operations of the second layer of the NN by use of the second configuration of the allocated hardware resources.

2. The method of claim 1, wherein the pre-processing operation comprises an executable binary referenced by the request.

3. The method of claim 1, comprising:
storing, in a queue, the first and second configurations of hardware resources to perform operations associated with the request, wherein the first and second configurations of hardware resources are available for access by one or more accelerator devices for performing the operations.

4. The method of claim 1, comprising:
selecting one or more hardware resources for performing the operations associated with the request among the first and second configurations of hardware resources.

5. The method of claim 1, wherein the first layer of the NN comprises a data processing stage in the NN and wherein the NN comprises multiple stages.

6. The method of claim 1, wherein the operations associated with the request in the first layer of the NN comprise machine learning (ML) inference operations.

7. The method of claim 1, wherein the NN comprises the pre-processing operation.

8. At least one non-transitory computer-readable medium comprising instructions stored thereon, that if executed by one or more processors, cause the one or more processors to:
prior to scheduling and performance of a first layer of a neural network (NN), perform a pre-processing operation to determine a first configuration of hardware resources to perform operations of the first layer of the NN associated with a request based on at least one service level agreement (SLA) parameter associated with the request;
perform the operations of the first layer of the NN by use of the first configuration of the hardware resources;
prior to scheduling and performance of a second layer of the NN, determine a second configuration of hardware resources to perform operations of the second layer of the NN associated with the request based on the at least one SLA parameter associated with the request; and
perform the operations of the second layer of the NN by use of the second configuration of the hardware resources.

9. The computer-readable medium of claim 8, wherein an executable binary is associated with the request and wherein the performing the pre-processing operation comprises execution of the executable binary.

10. The computer-readable medium of claim 8, comprising instructions stored thereon, that if executed by one or more processors, cause the one or more processors to:
store the first and second configurations of hardware resources to perform the operations associated with the request, wherein the first and second configurations of hardware resources are available for access by one or more accelerator devices to perform the operations.

11. The computer-readable medium of claim 8, comprising instructions stored thereon, that if executed by one or more processors, cause the one or more processors to:
select one or more hardware resources for performance of the operations associated with the request based on one or more of the first and second configurations of hardware resources.

12. The computer-readable medium of claim 8, wherein the first layer of the NN comprises a data processing stage in the NN and wherein the NN comprises multiple stages.

13. The computer-readable medium of claim 8, wherein the operations associated with the request in the first layer of the NN comprise machine learning (ML) inference operations.

14. A system comprising:
at least one processor and
circuitry to:
prior to scheduling and performance of a first layer of a neural network (NN), perform a pre-processing operation to determine a first configuration of hardware resources to perform operations of the first layer of the NN associated with a request based on at least one service level agreement (SLA) parameter associated with the request;
perform the operations of the first layer of the NN by use of the first configuration of the hardware resources;
prior to scheduling and performance of a second layer of the NN, determine a second configuration of hardware resources to perform operations of the second layer of the NN associated with the request based on the at least one SLA parameter associated with the request; and
perform the operations of the second layer of the NN by use of the second configuration of the hardware resources.

15. The system of claim 14, wherein an executable binary is associated with the request and wherein the perform the pre-processing operation comprises execution of the executable binary.

16. The system of claim 15, wherein a processor of the at least one processor is to execute the executable binary.

17. The system of claim 14, wherein the circuitry is to:
store the first and second configurations of hardware resources to perform the operations associated with the request, wherein the first and second configurations of hardware resources are available for access by one or more accelerator devices to perform the operations.

18. The system of claim 14, wherein the circuitry is to:
select one or more hardware resources for performance of the operations associated with the request based on one or more of the first and second configurations of hardware resources.

19. The system of claim 14, wherein the operations associated with the request in the first layer of the NN comprise machine learning (ML) inference operations.

20. At least one non-transitory computer-readable medium comprising instructions stored thereon, that if executed by one or more processors, cause the one or more processors to:
receive a request to perform a pre-processing operation and at least one service level agreement (SLA) parameter;
prior to scheduling and performance of a first layer of a neural network (NN), determine a first configuration of hardware resources to perform operations of the first layer of the NN associated with the request in a subsequent stage, wherein the pre-processing operation is based on operations of a neural network (NN) and the at least one SLA parameter;
cause performance of the operations of the first layer of the NN by use of the first configuration of the hardware resources;
prior to scheduling and performance of a second layer of the NN, determine a second configuration of hardware resources to perform operations of the second layer of the NN associated with the request based on the at least one SLA parameter associated with the request; and
perform the operations of the second layer of the NN by use of the second configuration of the hardware resources.

21. The computer-readable medium of claim 20, comprising instructions stored thereon, that if executed by one or more processors, cause the one or more processors to:
store the first and second configurations of hardware resources to perform the operations associated with the request in the subsequent stage, wherein the first and second configurations of hardware resources are available for access by one or more accelerator devices to perform the operations and
select one or more hardware resources for performance of the operations associated with the request based on one or more of the first and second configurations of hardware resources.

* * * * *